United States Patent
Stevens

(10) Patent No.: US 10,447,124 B2
(45) Date of Patent: Oct. 15, 2019

(54) PAIRS OF COMPLEMENTARY UNIDIRECTIONALLY MAGNETIC ROTOR/STATOR ASSEMBLIES

(71) Applicant: PACIFIC INTERNATIONAL ENERGY SOLUTIONS INC., Honolulu, HI (US)

(72) Inventor: Sunny Ouray Stevens, Honolulu, HI (US)

(73) Assignee: Pacific International Energy Solutions Inc., Honolulu, HI (US)

( * ) Notice: Subject to any disclaimer, the term of this patent is extended or adjusted under 35 U.S.C. 154(b) by 308 days.

(21) Appl. No.: 15/599,060

(22) Filed: May 18, 2017

(65) Prior Publication Data

US 2017/0338725 A1 Nov. 23, 2017

Related U.S. Application Data

(60) Provisional application No. 62/339,439, filed on May 20, 2016.

(51) Int. Cl.
| | | |
|---|---|---|
| H02K 1/27 | (2006.01) | |
| H02K 15/03 | (2006.01) | |
| F03D 3/06 | (2006.01) | |
| H02K 21/24 | (2006.01) | |
| H02K 7/18 | (2006.01) | |
| H02K 16/00 | (2006.01) | |
| F03D 9/25 | (2016.01) | |
| H02K 1/06 | (2006.01) | |
| H02K 1/22 | (2006.01) | |
| H02K 15/02 | (2006.01) | |

(52) U.S. Cl.
CPC ............ *H02K 15/03* (2013.01); *F03D 3/065* (2013.01); *F03D 9/25* (2016.05); *H02K 1/2733* (2013.01); *H02K 7/183* (2013.01); *H02K 16/00* (2013.01); *H02K 21/24* (2013.01); *H02K 1/06* (2013.01); *H02K 1/22* (2013.01); *H02K 1/27* (2013.01); *H02K 1/272* (2013.01); *H02K 1/2706* (2013.01); *H02K 1/2726* (2013.01); *H02K 15/02* (2013.01); *Y02E 10/74* (2013.01)

(58) Field of Classification Search
CPC ...... H02K 1/2733; H02K 15/03; H02K 21/24; H02K 7/183; H02K 16/00; H02K 1/06; H02K 1/2726; H02K 1/2706; H02K 1/27; H02K 1/22; H02K 1/272; H02K 15/02; F03D 3/065; F03D 9/25; Y02E 10/74
USPC .................................................. 310/112–114
See application file for complete search history.

(56) References Cited

U.S. PATENT DOCUMENTS

| | | | |
|---|---|---|---|
| 3,783,313 A * | 1/1974 | Mathur ................. | H02K 37/02 310/114 |
| 6,278,194 B1 | 8/2001 | Nakagawa et al. | |
| 9,331,534 B2 | 5/2016 | Yost | |
| 9,667,126 B2 * | 5/2017 | Shen ...................... | H02K 16/02 |

(Continued)

*Primary Examiner* — Naishadh N Desai
(74) *Attorney, Agent, or Firm* — Martin E. Hsia

(57) ABSTRACT

Pairs of unidirectionally magnetic rotor/stator assemblies are mounted for synchronous rotation and complementary, so that one creates pulsating positive current flow and the other creates pulsating negative current flow, as the rotor and stator in each assembly are rotated with respect to each other. The pulsating positive current flow and pulsating negative current flow are combined at a desired phase angle to create alternating current, without power loss due to reversal of current flow.

13 Claims, 5 Drawing Sheets

(56) References Cited

U.S. PATENT DOCUMENTS

| | | |
|---|---|---|
| 10,033,314 B2 | 7/2018 | Oelofse |
| 2007/0172231 A1 | 7/2007 | Durfee |
| 2010/0225196 A1 | 9/2010 | Greetham et al. |
| 2014/0232227 A1 | 8/2014 | Ionel et al. |
| 2014/0265700 A1 | 9/2014 | Patterson et al. |

* cited by examiner

PAIRS OF COMPLEMENTARY UNIDIRECTIONALLY MAGNETIC ROTOR/STATOR ASSEMBLIES

TECHNICAL FIELD

This invention relates to pairs of complementary unidirectionally magnetic rotor/stator assemblies, in which the rotors or stators have magnets with all their magnetic fields aligned parallel to the axis of rotation and their magnetic poles all pointing in the same direction, with the magnets inducing electric current in adjacent associated coils as the rotors or stators in each assembly rotate with respect to each other.

BACKGROUND ART

Magnets have both north and south poles, and a magnetic field extending between and around the poles. When a mechanical force causes a wire or other electrical conductor to move through a magnetic field, an electric current is induced to flow in the electrical conductor. This is the principle of an electric generator. Conversely, when an electric current flows through a wire or other electrical conductor, a magnetic field is created around the conductor, and if the conductor is in an existing magnetic field, the magnetic field around the conductor interacts with the existing magnetic field to create a mechanical force that tends to move the conductor. This is the principle of an electric motor. Electric generators convert mechanical force into electric current, and electric motors convert electric current into mechanical force.

Conventional electric generators and conventional electric motors have a rotating portion called the rotor, which rotates within or adjacent to a stationary structure called the stator. Magnets (either permanent magnets or electromagnets) are placed on the rotor, and conducting wire is placed in the stator, or vice versa. The wire is usually wound (preferably, around cores, but optionally without cores) to form coils of wire that are (at least in part) at right angles to the axis of rotation of the rotor, because the lines of the magnetic field created by an electric current are at right angles to, and rotate around, the direction of flow of the current: under the "right hand rule", if your right thumb points along the direction of electric current, then your right hand's fingers show the direction of the magnetic field lines extending from the north pole to the south pole.

Thus, in an electric generator, a mechanical force that causes the magnets in the rotor to rotate, induces an electric current to flow through the wires in the coils in the stator, thus generating an electric current to flow through those wires. In an electric motor, an electric current flowing through the wires in the coils in the stator creates a magnetic field, thus creating a force against the magnets in the rotor that causes the rotor to rotate. In both electric generators and electric motors, the magnets can be in the stator and the coils can be in the rotor instead.

It should be noted that electric current is conventionally characterized as the direction of positive charge (such as the positive terminal of a battery), which is the opposite of the direction of actual flow of negatively charged electrons: electrons actually flow towards the negative terminal of a battery. The voltage of an electric current is the pressure of the electron flow, and can be negative, when electrons are flowing one way (towards the negative terminal), or positive, when electrons are flowing the other way. If electrons are not flowing, there is no electric current, and therefore no voltage. When electrons flow in only one direction, this is called direct current. Direct current can be either negative or positive, depending on which way the electrons are flowing.

When electrons flow in one direction, and then in the opposite direction, this is called alternating current, because the voltage alternates from negative to positive.

Alternating current is important for transmitting electricity, because energy can be transmitted much more efficiently using alternating current than using direct current, especially at high voltages. This is why electricity provided by electric utilities is usually alternating current, and why long distance electric transmission lines are at high voltages.

Many alternative energy generating technologies, such as solar photovoltaic cells, inherently create direct current, which must then be changed to alternating current using an "inverter." Many types of devices, such as battery chargers, use direct current, so alternating current is often changed to direct current using a "rectifier."

Electricity must be used in a circuit, where electricity flows from one part of the circuit (usually a battery or generator creating a voltage that pushes an electric current), all the way through the remainder of the circuit, and returns to its origin (the battery or generator). The amount of energy that can be extracted from any electric current, whether direct or alternating, depends on the difference in voltages (electric pressure) between one part of the circuit (through which the current is flowing), and another part of the circuit, and also on the amount of current that is flowing—the greater the difference in voltages between the two parts of the circuit, and the greater the current flowing at those voltages, the more energy can be extracted from the circuit.

The remainder of this disclosure will discuss electric generators, but the person having ordinary skill in the art ("ordinary artisan") would recognize that this disclosure is also applicable to electric motors, when run in reverse.

Conventional electric generators are designed so that the direction of electron flow, and therefore the polarity of the electric current, reverses at a certain point or points during each turn of the rotor, to create alternating current. However, this alternating current creates drag or "cogging" due to the interactions of the reversing current flow with the magnets in the generator. Also, substantial energy is lost because current flow causes magnetization of the cores of the coils, and reversal of that current flow causes demagnetization and then opposite magnetization of those cores, which wastes energy. This "cogging" in a wind generator means that higher wind speeds may be required to start the generator rotating, thus raising the "start up speed." Further, a wind generator may not be able to provide useful power until a minimum "cut in speed" of the wind generator has been reached.

If the generator of this invention is used in a wind generator or other application in which the rotational speed of the rotor/stator assemblies will vary, then the frequency and voltage of the alternating current from the coils of the rotor/stator assemblies will vary with the wind speed, which may not provide useful power. In such an application, it would be preferable to connect the alternating current from the rotor/stator assemblies (which has uncontrollably varying frequency and voltage) to a rectifier, to provide useful DC current. However, the rectifier may not be able to provide useful DC current unless it is provided with a minimum amount of alternating current.

It should be noted that, if the present invention is used as a wind generator, it is preferred to use an electromagnetic brake to slow down rotation at excessive speed.

Because magnets always have both north and south poles, and because the goal is usually to make engines and generators smaller, and because magnets must be close to the coil/wire to maximize current flow, in most configurations of magnets and coils, the same portion of the coil/wire is exposed to successive north and south poles of the magnets, which also causes reversal of current flow. For example, a magnet in a rotor will pass by a coil in a stator, by having the north pole pass by first, then the south pole (or vice versa).

U.S. Pat. No. 9,331,534 to Yost, incorporated herein by this reference, discloses a magnetic generator for modular micro wind turbines with axially aligned magnets on each side of the rotor face. As a drive shaft rotates the rotors in proximity to stators, a magnetic flux and electricity is generated. Yost teaches that magnets should be separated by 0.04 to 0.6 inches to achieve "magnetic amplification": the closer the magnets, the higher the energy output (see col. 15, line 38, to col. 16, line 35, and FIGS. 56-61).

Published U.S. patent application Ser. No. 14/290,741 to Oelofse discloses a generator design using a modified Halbach Array.

DISCLOSURE OF INVENTION

The invention comprises a generator, that includes a pair of complementary stator/rotor assemblies, wherein the stator/rotor assemblies are mounted for synchronous rotation. By synchronous rotation is meant that rotation of the rotor of one stator/rotor assembly causes rotation of the rotor of the other stator/rotor assembly, although not necessarily at the same rate or at the same phase angle. Each of the stator/rotor assemblies includes a stator; coils mounted on the stator in a stator ring region; a rotor; magnets mounted on the rotor in a rotor ring region with the same shape and size as the stator ring region, with all the magnets' north poles oriented outward from a north face of the rotor disc and all the south poles oriented outward from the south face of the rotor disc. The rotor is mounted for rotation around an axis of rotation centered in, and perpendicular to, the stator ring region so that the rotor is parallel to, and closely displaced from, the stator by a rotor/stator gap. In this manner, the magnetic fields of the magnets are axially aligned with the axis of rotation and the magnets overlay the coils, separated by the rotor/stator gap. Rotation of the rotor around the axis of rotation causes the coils to travel towards and away from the poles of the magnets to induce a pulsating current flow in only one direction through the coils. The stator/rotor assemblies are separated from each other by a separation distance sufficiently great to avoid substantial drag from interaction of their magnetic fields. The coils and magnets of a first of the pair of stator/rotor assemblies are configured to be complementary to the coils and magnets of the second of the pair of stator/rotor assemblies, so the first of the pair creates pulsating current in only one direction, and the second of the pair creates pulsating current in the opposite direction, and the coils are wired and wound so that the pulsating currents are combined at a phase angle to create alternating current, whereby power loss from reversal of current flow is avoided.

In another embodiment, the invention comprises a generator with a first stator and a first rotor parallel to the first stator, mounted for rotation around a first rotor axis of rotation, closely displaced from the first stator by a first rotor/stator gap; and a second stator and a second rotor parallel to the second stator, mounted for rotation around a second rotor axis of rotation, closely displaced from the second stator by a second rotor/stator gap. A plurality of blades is drivably connected to the first rotor and the second rotor, so that when the blades rotate, the blades drive the first rotor and the second rotor to synchronous rotation. The first stator and the first rotor comprise a first stator/rotor assembly, and the second stator and the second rotor comprise a second stator/rotor assembly. Each of the stator/rotor assemblies comprises coils mounted on the stator in a stator ring region concentric with the rotor axis of rotation; magnets having magnetic fields with north and south poles mounted on the rotor in a rotor ring region having a shape and size substantially identical to the stator ring region, with all the north poles oriented outward from a north face of the rotor and all the south poles oriented outward from a south face of the rotor, so that the magnetic fields of the magnets are axially aligned with the rotor axis of rotation, so that the magnets overlay the coils, separated by the rotor/stator gap. Rotation of the rotors around the rotor axes of rotation causes the poles of the magnets to travel towards and away from the coils to induce a pulsating current flow in only one direction through the coils. The coils and magnets of the first stator/rotor assembly are configured to be complementary to the coils and magnets of the second stator/rotor assembly, so the first stator/rotor assembly induces a pulsating current in only one direction and the second stator/rotor creates a pulsating current flow in only the opposite direction, so that the pulsating current flows from both stator/rotor assemblies can be combined to create alternating current. The stator/rotor assemblies are separated from each other by a separation distance sufficiently great to avoid substantial drag from interaction of their magnetic fields. Power loss from reversal of current flow is avoided.

In another embodiment, the invention is a generator that includes a pair of unidirectionally magnetic stator/rotor assemblies having coils and magnets mounted for synchronous rotation. The coils and magnets of the first assembly are configured to be complementary to the coils and magnets of the second assembly. Thus, the first assembly creates pulsating positive current flow, and the second assembly creates pulsating negative current flow. A phase angle means is provided for controlling the phase angle between the pulsating positive current flow and the pulsating negative current flow to create alternating current. The phase angle means is a structure selected from the group consisting of angularly offsetting the coils and magnets of the first assembly from the coils and magnets of the second assembly, adding a resistive load to one assembly, and adding an inductive load to one assembly, whereby power loss from reversal of current flow is avoided.

BEST MODES FOR CARRYING OUT INVENTION

Figure 1:
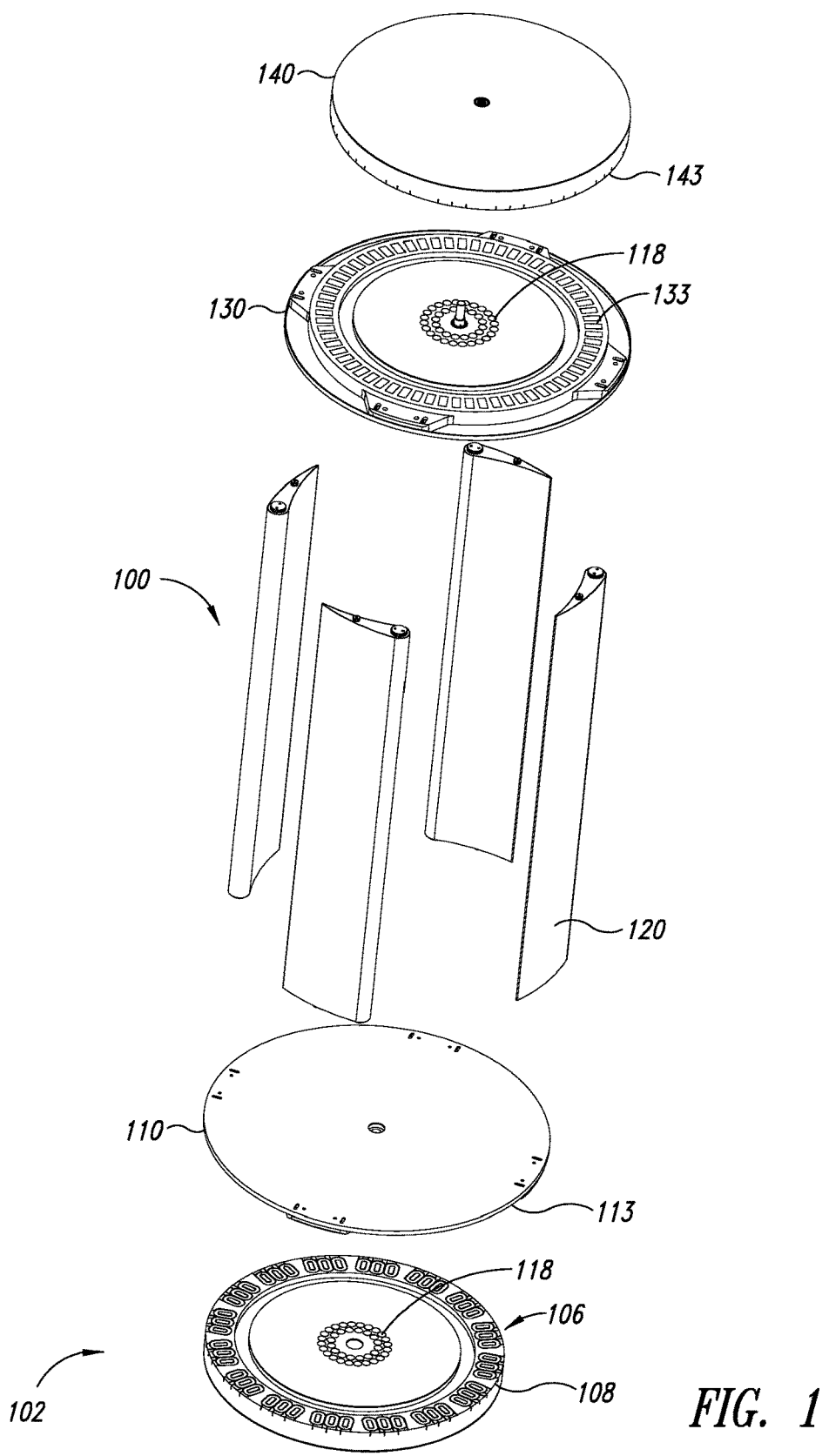
FIG. 1 is an exploded perspective view of a presently preferred embodiment of a generator according to the present invention, installed in a vertical axis wind turbine.

Referring to FIG. 1, shown is an exploded perspective view of a presently preferred embodiment of the present invention 100, installed in a vertical axis wind turbine. A bottom stator 102 is mounted on a base (not shown). A set of coils 106 is installed in a ring shaped (annular) stator ring region 108 on the top face of the bottom stator 102. A bottom rotor 110 is rotatably mounted parallel to and closely separated from the bottom stator 102 by a rotor/stator gap. A plurality of blades 120 is mounted on top of the bottom rotor 110. A top rotor 130 is mounted on top of the blades 120, and also rotatably mounted from a top stator 140 that is parallel to and closely separated from the top rotor 130 by a rotor/stator gap. The top rotor and top stator, separated by the rotor/stator gap, are referred to collectively as the top rotor/stator assembly, and the bottom rotor and bottom stator, separated by the rotor/stator gap, are referred to collectively as the bottom rotor/stator assembly.

Figure 2:
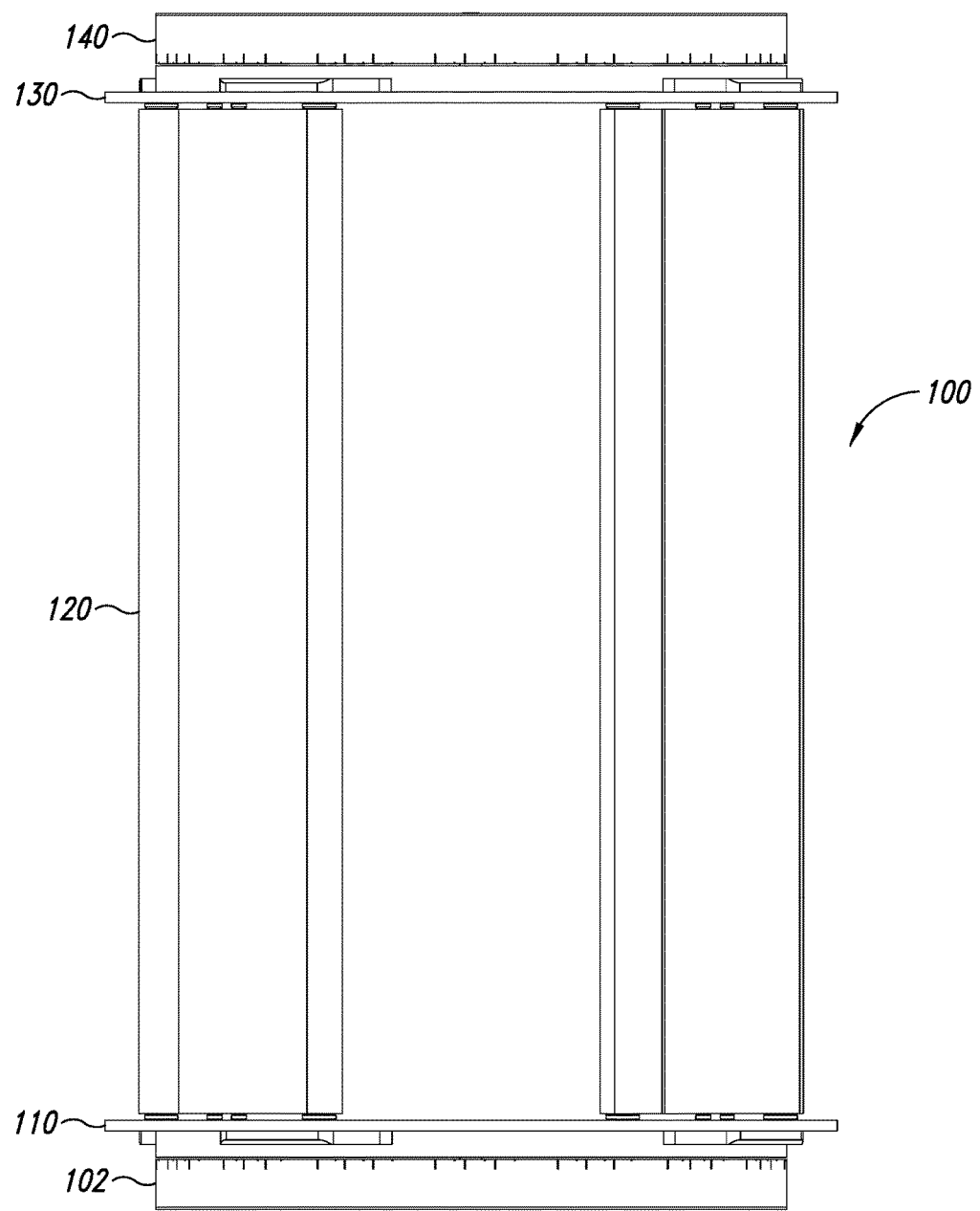
FIG. 2 is an elevational view from the side of FIG. 1.

Referring to FIG. 2, shown is a side elevational view of the presently preferred embodiment of the present invention 100, showing the bottom stator 102, bottom rotor 110, blades 120, top rotor 130, and top stator 140. Preferably, the blades 120 are made from resin, like surfboards, with a titanium skeleton. Preferably the rotors 110 and 130 and the stators 102 and 140 are made of FR4 composite material, or lighter.

The top stator 140, top rotor 130, bottom rotor 110 and bottom stator 102 can all be retained in place and/or rotatably mounted with respect to each other by any means, such as a shaft joining them together, or a housing surrounding them, or any other structure or mechanism, now known or hereafter invented.

Figure 3:
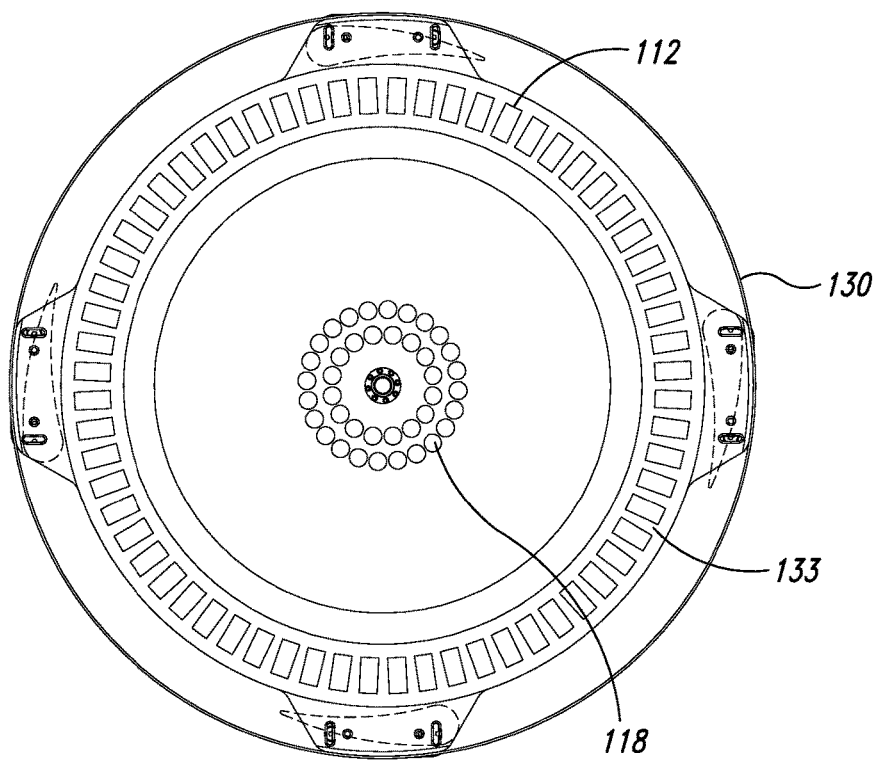
FIG. 3 is a plan view from the top of a top rotor according to a presently preferred embodiment of the present invention.

Referring to FIG. 3, shown is a plan view from the top of the top face of the top rotor 130. The plan view from the bottom of the bottom face of the bottom rotor 110 would be identical. As shown in FIG. 3, a series of magnets 112 is disposed on a ring shaped (annular) rotor ring region 133 on the top surface of the top rotor 130.

Returning to FIG. 1, the bottom face of the bottom rotor 110 preferably has a ring shaped (annular) rotor ring region 113 with a shape and size substantially identical to the stator ring region 108. Similarly, the bottom face of the top stator 140 has a ring shaped (annular) stator ring region 143 preferably with a shape and size substantially identical to the rotor ring region 133 of the top rotor. Thus, the magnets 112 overlay the coils 106, separated by a rotor/stator gap.

The magnets 112 are preferably rare earth magnets, and more preferably neodymium magnets, but any sufficiently powerful magnets can be used to practice the present invention. Optional cooling holes (not shown) extending radially like spokes can be provided. Optionally also, additional levitating magnets 118 can be provided, preferably interspersed between the cooling holes.

Figure 4:
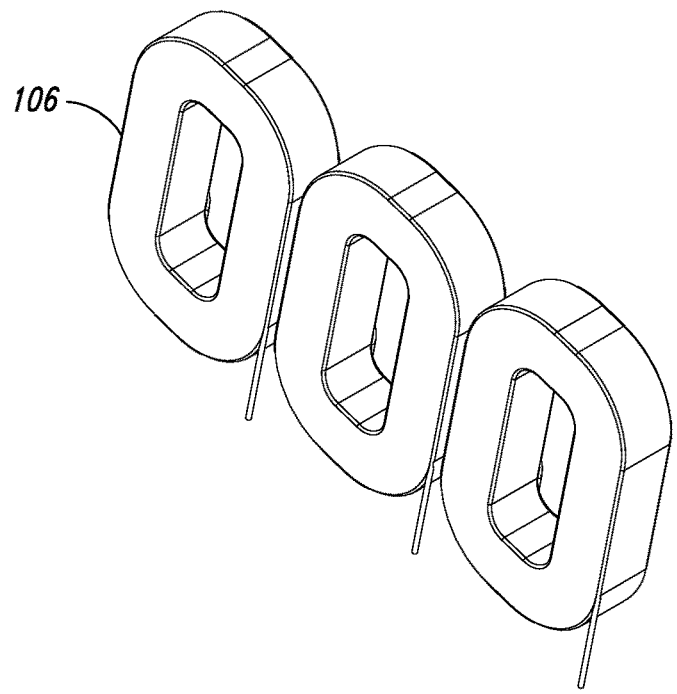
FIG. 4 is a perspective view of a set of coils according to a presently preferred embodiment of the present invention.

Referring to FIG. 4, shown is a perspective view of a set of coils 106 according to the presently preferred embodiment of the present invention.

Figure 5:
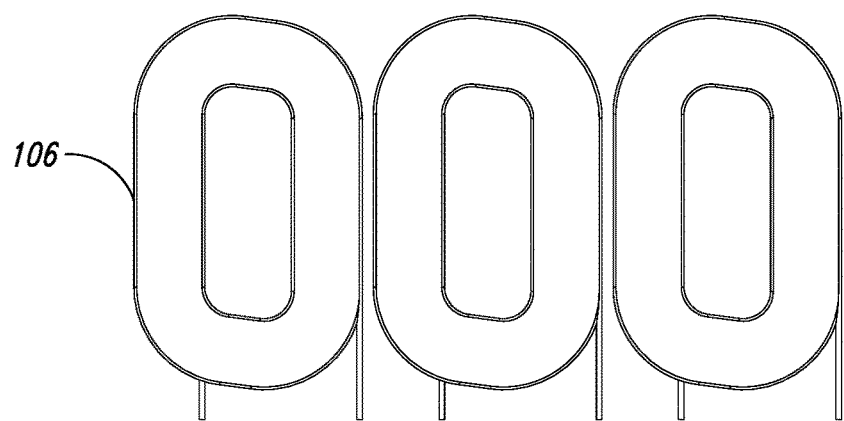
FIG. 5 is a plan view from the top or bottom of a set of coils according to the presently preferred embodiment of the present invention.

Referring to FIG. 5, as can be seen, the wires of the coils 106 are preferably wound in the shape of a parallelogram.

Figure 6:
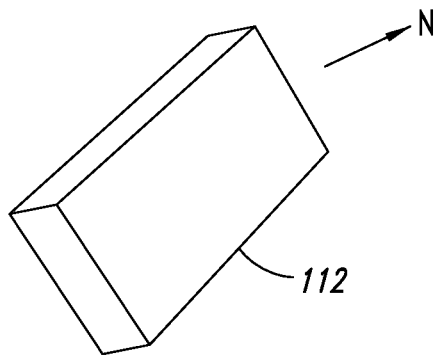
FIG. 6 is a perspective view of a magnet 112 according to the presently preferred embodiment of the present invention.

Referring to FIG. 6, shown is a perspective view of one of the magnets 112 in one of the rotors 110, 130 (see FIG. 1). The magnets must be oriented with all the north poles N aligned in the same direction, and all the south poles in the opposite direction.

Figure 7:
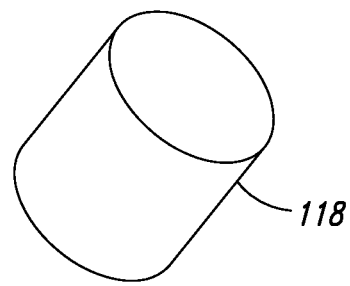
FIG. 7 is a perspective view of an optional levitation magnet according to the presently preferred embodiment of the present invention.

Referring to FIG. 7, shown is a perspective view of an optional magnetic levitation magnet 118 according to the present invention.

Although the attached figures show that the magnets are in the rotors, and the coils are in the stators, the ordinary artisan would recognize that these could be reversed in either or both rotor/stator assemblies, so that the magnets are in either or both of the stators, and the coils are in either or both of the rotors.

The ordinary artisan would also recognize that, if the rotor/stators are coaxial, the magnets of the rotor/stator pairs could be oriented with their respective north poles pointing in the same direction, or in opposite directions, as long as the coils are appropriately wound and oriented. As noted below, the rotor/stators do not need to be coaxial, and need only be mounted for synchronous rotation.

Further, although the attached drawings show that the bottom rotor/stator pair is coaxial with the top rotor/stator pair, this is not necessary. The rotor/stator pairs only need to be in synchronous rotation, that is, they must rotate at the same rate. Thus, for example, the present invention could be practiced with pairs of rotor/stator assemblies that are not coaxial, but are mounted for synchronous rotation by each rotor/stator assembly being connected to a complementary rotor/stator assembly by gears.

Alternatively, the rotor/stator assemblies can be mounted for synchronized proportionate rotational velocity, that is, where the rotor and stator in an assembly may have different diameters from the rotor and stator in a different assembly, but the respective rotation rates of the assemblies are proportioned to compensate (by gears, pulleys, or other mechanisms), so that the magnets and coils in each rotor/stator assembly pass over each other at the same rate as in the other rotor/stator assemblies.

Preferably, the rotor/stator assemblies are separated from each other by a separation distance sufficiently great to avoid substantial drag from interaction of their magnetic fields.

By "unidirectionally magnetic" is meant that the magnetic fields of the magnets are all oriented in the same direction, preferably parallel to the axis of rotation of the rotor/stator assembly in which those magnets are installed, with all the magnetic north poles oriented in the same direction, and all the magnetic south poles oriented in the opposite direction.

By complementary is meant that the pulsing electric current of one polarity from one rotor/stator assembly can be combined with the pulsing electric current of the opposite polarity from the other rotor/stator assembly to create alternating current. For example, one rotor/stator assembly may create pulsing electric current that is only positive in polarity, and the other rotor/stator assembly may create pulsing electric current that is only negative in polarity. Rotor/stator assemblies can be made complementary by changing the winding direction, orientation, or other characteristics, of the coils, by reversing the orientations of the magnetic poles of the magnets (as long as they remain unidirectionally magnetic), or by other means within the skill of the ordinary artisan, and adjusting the phase angle between the pulsing electric currents, to achieve alternating current. Adjusting the phase angle between the pulsing electric current of one polarity and the pulsing electric current of the opposite polarity can be accomplished by wiring, shaping, placement or orientation of the coils, connecting inductive or resistive loads to the coils, offsetting the magnets and coils in one rotor/stator pair from the magnets and coils of the other rotor/stator pair (so when the magnets and coils of one rotor/stator are closest to each other, the magnets and coils of the other rotor/stator are farthest away), or by other means within the skill of the ordinary artisan.

It would also be within the skill of the ordinary artisan to vary the coils and magnets, and to add or vary other components, to provide multiple phase alternating current, or alternating current with different wave forms or other characteristics, if desired.

It would be within the skill of the ordinary artisan to practice the present invention with devices of different scales and configurations, to meet desired market or technical or mass production goals, such as by providing appropriate generation capacity to qualify for favorable alternative energy subsidy rates, or providing devices of different generating capacities that can fit within the same size housing.

It is preferred that the coils and magnets be easily replaceable for repair or varying generation capacity or to use better permanent magnets that may be developed in the future, or for other reasons.

The ordinary artisan would recognize that, instead of permanent magnets, electromagnets of appropriate strength could be used, if desired.

In the embodiment illustrated in the attached drawings, as the bottom rotor 110 rotates, the wires in the coils 106 in the bottom stator 102 are mostly exposed to only the north magnetic poles of the magnets in the rotor ring region 113 in the bottom rotor, and mostly are not exposed to the south magnetic poles. As the magnets 112 approach a coil 106, pass over a coil, and move away from a coil, this creates pulses of electric current, but all in only one direction, so that the electric current either varies from zero to a positive voltage, or from zero to a negative voltage, depending on how the coils are wound: the pulsing electric current only has voltage of one polarity. Extracting energy from a pulsing electric current of one polarity is not efficient—the energy can be extracted only from the potential between the electric current and ground (zero).

Preferably, the magnets 112 in the top rotor 130 and the coils in the top stator 140 are complementary to the magnets 112 in the bottom rotor 110 and bottom stator 102, so that the "phase angle" between the two currents is adjusted, preferably to 180 degrees (optionally to increments of up to 45 degrees), so they are out of phase, to result in the maximum voltage (of one polarity) of one coinciding with the zero voltage (of the other polarity) of the other, so that connecting the coils results in alternating current that ranges from the maximum voltage of a first polarity, through zero, to the maximum voltage of the other polarity, through zero, back to the maximum voltage of the first polarity, etc., resulting in alternating current.

The phase angle of the two currents can be adjusted using other methods that are within the skill of the ordinary artisan, such as different wirings or locations or orientations of the coils, or having the coils of one stator/rotor assembly angularly offset from the coils of the complementary stator/rotor assembly. The phase angle can also be adjusted to angles other than 180 degrees (such as increments of up to 45 degrees) using methods known to the ordinary artisan if other phase angles are desired.

A person of ordinary skill in the art would recognize that various different configurations of coils (including reversal of winding of coils), wires, magnets, and other components, could be used with this invention, including to change phasing, as long as complementary pairs of unidirectionally magnetic rotors/stators are used. All such configurations are within the scope of the claims of this patent.

INDUSTRIAL APPLICABILITY

The present invention is applicable wherever it is desired to generate alternating current without power loss from reversal of current flow.

What is claimed is:

1. A generator, comprising:
a pair of complementary stator/rotor assemblies;
wherein said stator and rotor assemblies are mounted for synchronous rotation;
wherein each of said stator and rotor assemblies comprises:
a stator;
coils mounted on said stator in a stator ring region;
a rotor;
magnets having magnetic fields with north and south poles mounted on said rotor in a rotor ring region having a shape and size substantially identical to said stator ring region, with all said north poles oriented outward from a north face of said rotor and all said south poles oriented outward from a south face of said rotor;
wherein said rotor is mounted for rotation around an axis of rotation centered in, and perpendicular to, said stator ring region;
wherein said rotor is parallel to, and closely displaced from, said stator by a rotor/stator gap;
whereby said magnetic fields of said magnets are axially aligned with said axis of rotation; and
whereby said magnets overlay said coils, separated by said rotor/stator gap;
whereby rotation of said rotor around said axis of rotation causes said poles of said magnets to travel towards and away from said coils to induce a pulsating current flow in only one direction through said coils;
wherein said stator and rotor assemblies are separated from each other by a separation distance sufficiently great to avoid substantial drag from interaction of their magnetic fields;
wherein said coils and magnets of a first of said pair of stator and rotor assemblies are configured to be complementary to said coils and magnets of the second of said pair of stator and rotor assemblies, so the first of said pair creates pulsating current in only one direction, and the second of said pair creates pulsating current in the opposite direction, and said coils are wired and wound so that said pulsating currents are combined at a desired phase angle to create alternating current;
whereby power loss from reversal of current flow is avoided.

2. A generator according to claim 1, wherein said coils and magnets of said pair of stator and rotor assemblies are configured to be complementary by having said magnets of both of said stator and rotor assemblies aligned, with said north poles of both of said stator and rotor assemblies oriented in the same direction, and having coils of a first of said stator and rotor assemblies wound in a direction opposite said coils of the second of said stator and rotor assemblies.

3. A generator according to claim 1, wherein said coils and magnets of said pair of stator and rotor assemblies are configured to be complementary by having said magnets of both of said stator and rotor assemblies aligned, with said north poles of both of said stator and rotor assemblies oriented in opposite directions, and having said coils of the first of said stator and rotor assemblies wound in the same direction as said coils of the second of said stator and rotor assemblies.

4. A generator according to claim 1, wherein said coils and magnets of said pair of stator and rotor assemblies are configured to be complementary by having said magnets of both of said stator and rotor assemblies oriented in opposite directions, with coils of both said stator and rotor assemblies wound in the same direction.

5. A generator according to claim 1, wherein said rotors are discs.

6. A generator according to claim 1, wherein a first stator and rotor assembly is mounted on a bottom portion of a vertical axis wind turbine, and a second stator and rotor assembly is mounted on a top portion of said vertical axis wind turbine.

7. A generator according to claim 1, wherein said magnets are rare earth magnets.

8. A generator according to claim 7, wherein said rare earth magnets are neodymium magnets.

9. A generator according to claim 1, wherein said stator and rotor assemblies are coaxial.

10. A generator according to claim 1, further comprising a frame;
   wherein said stator and rotor assemblies are mounted for synchronous rotation within said frame by magnetic levitation magnets of opposite polarities mounted on said frame and on a bottom one of said rotors, respectively.

11. A generator, comprising:
   a first stator;
   a first rotor parallel to said first stator, mounted for rotation around a first rotor axis of rotation, closely displaced from said first stator by a first rotor/stator gap;
   a second stator;
   a second rotor parallel to said second stator, mounted for rotation around a second rotor axis of rotation, closely displaced from said second stator by a second rotor/stator gap;
   a plurality of blades drivably connected to said first rotor and said second rotor;
   whereby when said blades rotate, said blades drive said first rotor and said second rotor to synchronous rotation;
   wherein said first stator and said first rotor comprise a first stator and rotor assembly and said second stator and said second rotor comprise a second stator and rotor assembly;
   wherein each of said stator and rotor assemblies comprises:
   coils mounted on said stator in a stator ring region concentric with said rotor axis of rotation;
   magnets having magnetic fields with north and south poles mounted on said rotor in a rotor ring region having a shape and size substantially identical to said stator ring region, with all said north poles oriented outward from a north face of said rotor and all said south poles oriented outward from a south face of said rotor;
   whereby said magnetic fields of said magnets are axially aligned with said rotor axis of rotation; and
   whereby said magnets overlay said coils, separated by said rotor/stator gap;
   whereby rotation of said rotors around said rotor axes of rotation causes said poles of said magnets to travel towards and away from said coils to induce a pulsating current flow in only one direction through said coils;
   wherein said coils and magnets of said first stator and rotor assembly are configured to be complementary to said coils and magnets of said second stator and rotor assembly, so the first stator and rotor assembly induces a pulsating current in only one direction and the second stator and rotor creates a pulsating current flow in only the opposite direction, whereby the pulsating current flows from both stator and rotor assemblies can be combined to create alternating current;
   wherein said stator and rotor assemblies are separated from each other by a separation distance sufficiently great to avoid substantial drag from interaction of their magnetic fields;
   whereby power loss from reversal of current flow is avoided.

12. A generator, comprising:
   a pair of unidirectionally magnetic stator and rotor assemblies having coils and magnets mounted for synchronous rotation of said rotors;
   wherein coils and magnets of a first assembly are configured to be complementary to said coils and magnets of a second assembly;
   whereby the first assembly creates pulsating positive current flow, and the second assembly creates pulsating negative current flow; and
   phase angle means for controlling the phase angle between the pulsating positive current flow and the pulsating negative current flow to create alternating current;
   whereby power loss from reversal of current flow is avoided.

13. A generator according to claim 12, wherein said phase angle means is selected from the group consisting of angularly offsetting the coils and magnets of the first assembly from the coils and magnets of the second assembly, adding a resistive load to one assembly, and adding an inductive load to one assembly.

* * * * *